June 23, 1931.    H. R. BORMANN ET AL    1,810,901
WELDROD HOLDER FOR ELECTRIC ARC WELDING
Filed Sept. 16, 1929    2 Sheets-Sheet 1

INVENTORS:
Henry R. Bormann
and Alfons Steinhart
BY
ATTORNEY.

June 23, 1931.  H. R. BORMANN ET AL  1,810,901
WELDROD HOLDER FOR ELECTRIC ARC WELDING
Filed Sept. 16, 1929  2 Sheets-Sheet 2
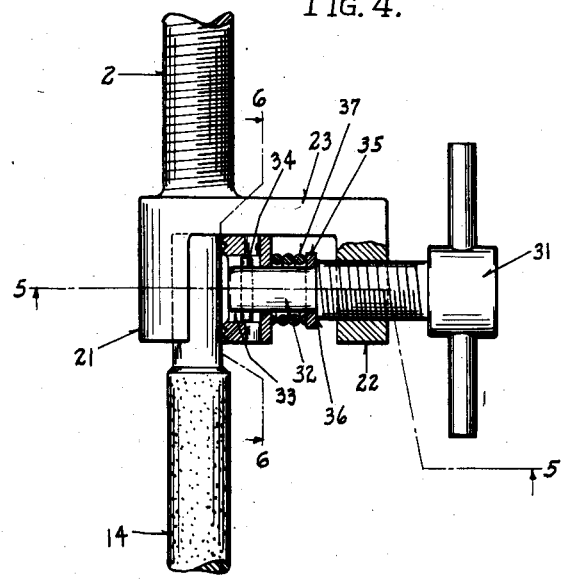
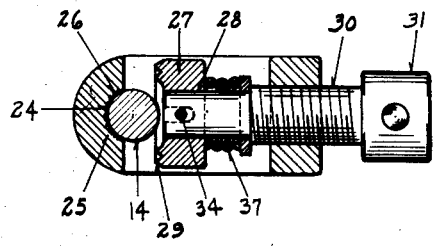
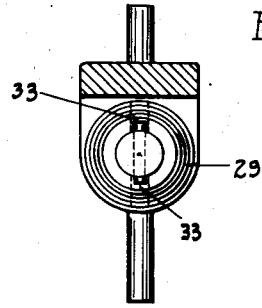
INVENTORS:
Henry R. Bormann
and Alfons Steinhart
BY
ATTORNEY.

Patented June 23, 1931

1,810,901

UNITED STATES PATENT OFFICE

HENRY R. BORMANN AND ALFONS STEINHART, OF MILWAUKEE, WISCONSIN, ASSIGNORS TO A. O. SMITH CORPORATION, OF MILWAUKEE, WISCONSIN, A CORPORATION OF NEW YORK

WELDROD HOLDER FOR ELECTRIC ARC WELDING

Application filed September 16, 1929. Serial No. 392,896.

This invention relates to a weldrod holder employed in electric arc welding and particularly to a holder for an automatic welding machine wherein the weldrod is fed toward the work at a speed proportionate to the rate of consumption of the weldrod in order to constantly maintain an arc of the desired length.

The object of the invention is to provide an improved holder for weldrods which will automatically remove scale and other foreign substances from the contact surface of the weldrod and provide an efficient electrical contact between the holder and the weldrod.

A further object of the invention is to provide a weldrod holder which will firmly and securely grip the end of the weldrod and prevent displacement thereof.

A further object of the invention is to provide a holder into which the weldrod may be quickly and easily inserted and removed.

A further object of the invention is to provide a weldrod holder which will contact with a greater surface area of the weldrod so as to uniformly distribute the flow of current to the rod and provide a minimum resistance to the flow of current between the holder and the rod.

The invention is best illustrated by referring to the accompanying drawings in which:

Fig. 4 is a sectional view of a further modification of the invention.

Fig. 5 is a view taken on line 5—5 of Fig. 4.

Fig. 6 is a view on line 6—6 of Fig. 4.

Figure 1:
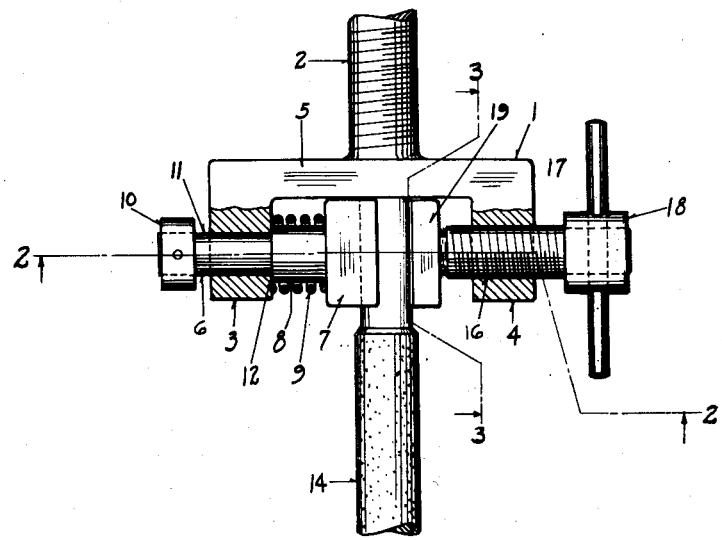
Figure 1 is a side elevation of the device showing parts thereof in section.
Figure 2:
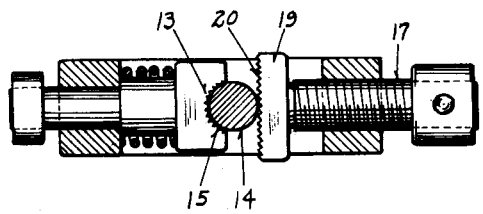
Fig. 2 is section taken on line 2—2 of Fig. 1.
Figure 3:
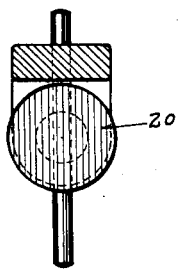
Fig. 3 is a section taken on line 3—3 of Fig. 1.

Referring to the drawings, the numeral 1 represents the weldrod holder having an upwardly extending threaded stem 2, the threads of which are adapted to engage with an automatic feeding mechanism of a welding head (not shown) to progressively feed the weldrod to the work at a rate in proportion to the consumption of the rod.

The threaded stem 2 has one end thereof bifurcated to form a pair of spaced ears 3 and 4 connected by a cross arm 5. The ear 3 is provided with a suitable opening in which is slidably mounted a rod 6 forming a support for the clamping member 7. The rod 6 has a portion 8 of enlarged diameter having a coil spring 9 disposed therearound. The end of the rod is provided with a nut 10 or other suitable means for locking the same in position.

The portion 11 of the rod having the reduced diameter is substantially longer than the thickness of the ear 3, thus enabling the clamping member to have a limited lateral movement between the shoulder 12 and the nut 10. The clamping face 13 is preferably curved to conform with the circumferential curvature of the weldrod 14 and is preferably provided with a plurality of pointed projections 15 adapted to grip the periphery of the weldrod when the same is in clamping position. The compression spring 9 normally urges the clamping member into clamping position.

The ear 4 is provided with a laterally extended threaded opening 16 in which a threaded extension 17 of the thumb screw 18 is adapted to engage. The free end of the thumb screw is provided with a suitable clamping plate 19 having the clamping surface 20 thereof roughened in any suitable manner. The other end of the thumb screw 18 is provided with suitable means for manually operating the same to effect a clamping of the weldrod.

Figs. 4, 5, and 6 disclose a modification of the invention wherein the threaded stem 2 is bifurcated at one end thereof to form a pair of spaced ears 21 and 22 connected by a cross arm 23. The ear 21 is provided with a curved inner wall 24 conforming with the circumferential curvature of the weldrod 14 and is adapted to form one of the clamping jaws 25 of the holder. The clamping surface thereof is preferably provided with a plurality of projections 26 or otherwise roughened in a suitable manner, as is clearly shown in Fig. 5.

The ear 22 is adapted to support suitable mechanism for radially adjusting the co-operating clamping jaw of the holder. This jaw preferably comprises a plate 27 having a recess 28 therein. The clamping face of the plate is provided with serrations 29 or other suitable projections, as is clearly shown in Fig. 5. The ear 22 is provided with a threaded opening in which is received the threaded extension 30 of a thumb screw 31. The thumb screw is provided with a longitudinally extending portion 32 of reduced diameter which extends into the recess 28 of the clamping plate. The recess is provided with oppositely disposed grooves 33 adapted to receive the ends of a transverse pin 34 extending through the portion of reduced diameter and projecting outwardly therefrom. A ring member 35 is provided which is adapted to engage the shoulder 36 and to form a backing for a compressible coil spring 37 encircling the portion of reduced diameter, the other end of the coil spring engaging the back of the plate 27 for normally urging the same into clamping position. The other end of the thumb screw 31 is provided with any suitable means for rotating the same to effect a lateral movement of the clamping jaw.

The clamping jaws yieldably engage the weldrod and relative movement may be effected between the jaws and the surface of the weldrod as by rotation of clamping member 19 to effect a burnishing of the weldrod surface and provide a good electrical contact between the holder and the rod.

The invention thus having been described in detail, it is understood that various modifications may be made within the scope of the appended claims.

What is desired to be protected by Letters Patent is:

1. A device of the class described comprising a clamping mechanism adapted to retain a weldrod in proper welding relation, means for applying pressure to said clamping mechanism to cause the same to firmly grip the weldrod, and abrading means effective upon the actuation of said pressure applying means for removing foreign material from the contacting surface of the weldrod.

2. A device of the class described comprising a clamping mechanism adapted to normally retain a weldrod in welding relation, spring pressed means for normally urging said clamping mechanism into engagement with said weldrod, means for applying additional pressure to said clamping mechanism to cause the same to firmly grip the weldrod, and abrading means effective upon the actuation of said pressure applying means for removing foreign material from the contacting surface of the weldrod.

3. A weldrod holder comprising clamping members adapted to engage a weldrod, a roughened surface on the clamping surface of one of said clamping members, and means for moving said clamping member having the roughened surface relative to the weldrod to abrade and remove foreign substances from the connecting surface of the weldrod.

4. A weldrod holder comprising a pair of cooperating clamping members adapted to grip the weldrod, resilient means for normally urging one of said clamping members into clamping position, a roughened face on one of said clamping members, and means for rotating said last named member while the same is in contact with the weldrod.

5. A weldrod holder comprising a pair of cooperating clamping members and means for effecting a prolonged abrading movement between the clamping member and the weldrod to remove foreign substances on the contacting surfaces of the weldrod and provide a good electrical contact between the clamping members and the weldrod.

6. A weldrod holder comprising a pair of opposing clamping members, a slidable mounting for one of said clamping members, spring pressure means for urging the slidably mounted clamping member towards the cooperating clamping member, an abrading face upon said cooperating clamping member, means for moving said cooperating clamping member towards the slidably mounted clamping member and rotating the abrading face of said cooperating clamping member to remove foreign substances from a welding electrode clamped between said pair of clamping members.

In testimony whereof, we have signed our names at Milwaukee, Wisconsin, this 12th day of September, 1929.

HENRY R. BORMANN.
ALFONS STEINHART.